United States Patent [19]

Meier

[11] 4,296,050
[45] Oct. 20, 1981

[54] PACKING ELEMENT FOR AN EXCHANGE COLUMN

[75] Inventor: Werner Meier, Elgg, Switzerland

[73] Assignee: Sulzer Brothers Ltd., Winterthur, Switzerland

[21] Appl. No.: 845,784

[22] Filed: Oct. 26, 1977

[30] Foreign Application Priority Data

May 12, 1977 [CH] Switzerland ................ 5948/77

[51] Int. Cl.³ .............................................. B01F 3/04
[52] U.S. Cl. .................................... 261/112; 165/166; 261/DIG. 72
[58] Field of Search .................... 261/94–98, 261/112, 113, DIG. 72, 79 A; 55/240, 241; 165/166; 210/150, 151

[56] References Cited

U.S. PATENT DOCUMENTS

| 899,899 | 9/1908 | Peterson | 261/97 X |
|---|---|---|---|
| 2,911,056 | 11/1959 | Edel | 261/112 X |
| 3,285,587 | 11/1966 | Huber | 261/96 |
| 3,415,502 | 12/1968 | Munters | 261/DIG. 11 |
| 3,618,778 | 11/1971 | Benton et al. | 261/112 X |
| 3,704,869 | 12/1972 | Priestley | 261/112 |
| 3,738,626 | 6/1973 | Norback | 261/112 |
| 3,785,620 | 1/1974 | Huber | 261/DIG. 72 |
| 3,952,077 | 4/1976 | Wigley | 261/112 |

FOREIGN PATENT DOCUMENTS 1253673 11/1967 Fed. Rep. of Germany ...... 261/112

Primary Examiner—Richard L. Chiesa
Attorney, Agent, or Firm—Kenyon & Kenyon

[57] ABSTRACT

The packing element is made up of a plurality of corrugated plates which are provided with a plurality of apertures as well as with a fine fluting on the walls of the corrugations. The flutings are disposed on both sides of the plates. The flutings are in the form of grooves which extend at an angle to the axis of the column which is of opposite sign to the angle of the corrugations relative to the axis of the column.

11 Claims, 5 Drawing Figures

PACKING ELEMENT FOR AN EXCHANGE COLUMN

This invention relates to a packing element for an exchange column and, particularly, to a mass transfer column or heat exchange column.

As is known, various types of exchange columns have been known in which a gas and a liquid come into contact with another, preferably in countercurrent. In some cases, use has been made of packing elements formed of corrugated plates which contact one another and are disposed in parallel to the column axis in order to encourage contact between the liquid and gas. In such cases, the folds or corrugations of the plates are disposed at an angle to the column axis. Generally, packing elements which are made of foil-like material, such as sheet metal, are cheaper to produce than packing elements which are made of a self-wetting woven wire fabric. However, a uniform distribution of the liquid over the surface of a plate of foil-like material does not usually occur since capillary forces do not come into operation. As is known, a uniform liquid distribution is essential for an effective mass transfer or heat exchange with a gas phase.

It is further known that the main flow of liquid in packing elements made of corrugated plates is along the fold troughs, i.e. the liquid is channelled and does not trickle uniformly over the plates.

It has been suggested that the plates of a packing element be formed with apertures or orifices so that the descending liquid is deflected to both sides of an aperture at the top edge zones of the apertures. However, this feature can provide only a coarse distribution of the liquid over the plate surfaces.

In the case of an imperforate corrugated plate, it is also known to utilize a fine fluting on the plates in addition to the coarse corrugation in order to improve liquid distribution over the plate surfaces by capillary action and channelling.

In practice, it has been found that the two features of using apertures and using a fine fluting by themselves do not provide a satisfactory uniform distribution of liquid over the surfaces of the corrugated plates.

Accordingly, it is an object of the invention to provide for a very uniform liquid distribution over corrugated plates made of a foil-like material.

It is another object of the invention to increase the efficiency of a packing element made up of corrugated plates of foil-like material.

Briefly, the invention provides a packing element for an exchange column which comprises a plurality of corrugated plates of foil-like material which are disposed in contacting parallel relation. In addition, each plate has corrugations which are disposed at an angle and in crisscrossing relation to the corrugations of an adjacent plate. Further, in accordance with the invention, each plate is provided with a plurality of apertures which are distributed therein and each corrugation is provided with a fine fluting, for example in the form of grooves.

The term "fluting" as used herein is to be understood as denoting a roughening of the plate surface by grooving or by the impression of a pattern, for example a herringbone pattern.

Surprisingly, it has been found that the combination of the fine fluting with the apertures in the plates leads to a very uniform distribution of the liquid over the plate surfaces. The contrary would have been expected because it would be assumed, prima facie, that the two characteristics would impede one another for the reason that the function of the fine fluting is to channel the liquid laterally while the function of the apertures is to interrupt or impede such channelling.

The corrugated plates of the packing can be made of metal such as copper, stainless steel, or Monel metal, or can be made of plastics.

Where the fine fluting is in the form of grooves, these grooves can extend horizontally, i.e. when the plates are disposed in a vertical plane, since this causes a lateral distribution of the liquid via the corrugation troughs as a result of capillary action. Advantageously, however, the angle between the fine grooving and the column axis lies between 15° and 90° and the corresponding angle between the coarse corrugation and the column axis lies between 15° and 60°. In this case, the lateral spreading out of the liquid over the plate surfaces as a result of capillary action is further increased by the force of gravity; the force of gravity being operative in the direction of the fluting troughs.

The length and height of the fine flutings or grooves can be dimensioned from 0.3 to 3.0 millimeters. The term "length" is to be understood in the transferred meaning of "wavelength".

These and other objects and advantages of the invention will become more apparent from the following detailed description and appended claims taken in conjunction with the accompanying drawings in which:

Figure 1A:
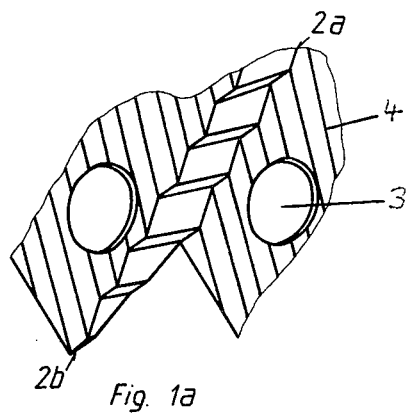
FIG. 1a is a view to an enlarged scale of a detail of FIG. 1.
Figure 1:
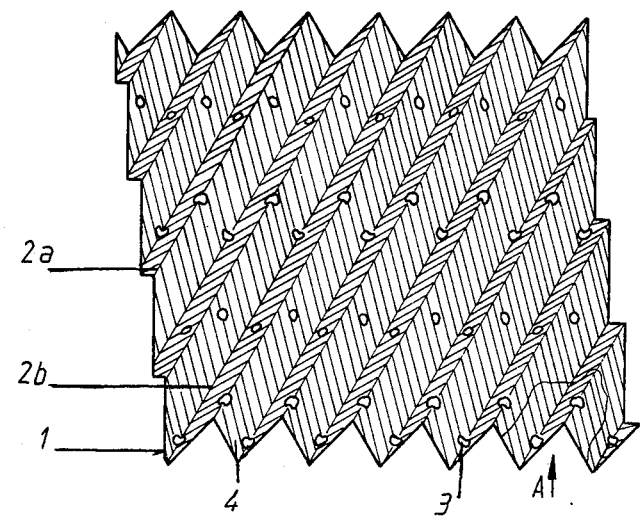
FIG. 1 illustrates a perspective view of a corrugated plate having apertures and grooves in accordance with the invention.
Figure 3:
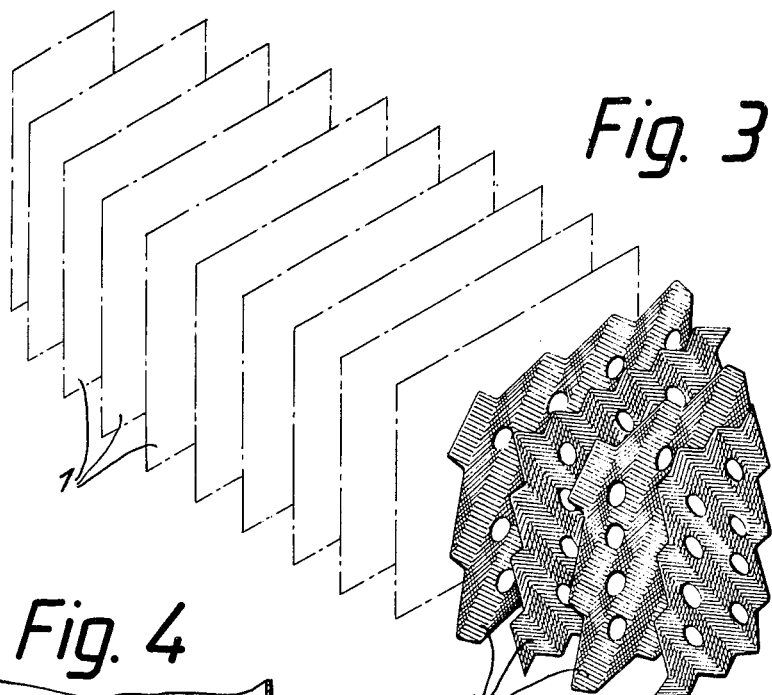
FIG. 3 illustrates a perspective view of a plurality of discrete plates before assembly to form a packing element in accordance with the invention.

Referring to FIG. 3, a packing element is made up of a plurality of corrugated plates 1. As shown in FIG. 1, each plate 1 has a coarse folding or corrugation forming crests 2a, and troughs 2b. The term "folding or corrugation" is to be understood herein as denoting a shape having sharp edges and a shape having curvilinear edges.

In addition, each plate 1 is formed with a number of apertures 3 which are distributed throughout the plate. Advantageously, the diameter of the apertures is in the order of magnitude of approximately 4 millimeters and the apertures occupy not more than 5 to 20% of the total surface area of the plate 1.

Further, each plate 1 is formed with a laterally extending fine fluting 4 at an angle opposite to the angle of inclination of the coarse corrugation. The length and height of the fine fluting is in the order of magnitude of from 0.3 to 3.0 millimeters so as to laterally distribute a liquid under capillary action across the plate 1.

Referring to FIG. 3, as indicated, each packing element is made up of a plurality of corrugated plates, for example 14 plates. Further, the corrugations of each plate 1 are disposed at an angle and in criss-crossing relationship to the corrugations of an adjacent plate. As shown, the 14 plates 1 are sized so as to form a packing element for placement into an exchange or transfer section of a cylindrical column.

Figure 4:
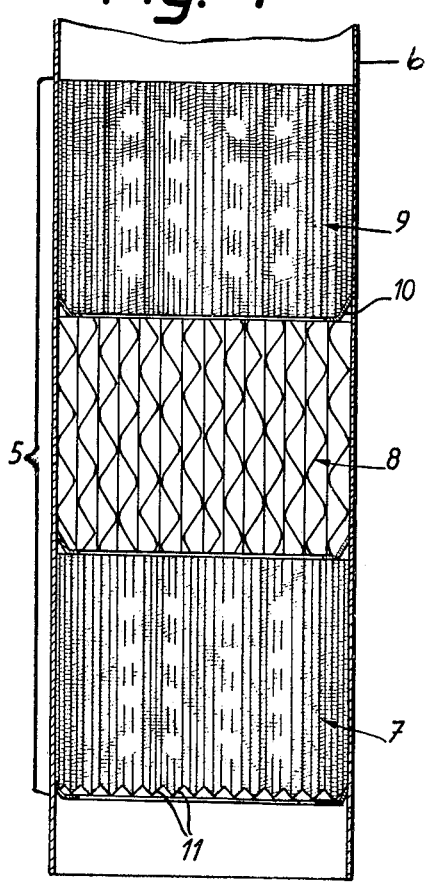
FIG. 4 illustrates a part of a column having three, packing elements therein.

Referring to FIG. 4, a portion 5 of an exchange or transfer section of a column 6 houses three packing elements 7, 8, 9, each of which is disposed at an angle of 90° to one another. Packing elements 7, 8, 9 are formed in the manner as indicated in FIG. 3. Each element 7, 8, 9 has a collar-like deflector element 10 at the bottom which serves to deflect liquid which descends along the inside wall of the column 6 inwardly along the bottom of each element 7, 8, 9.

In order to ensure that the liquid is deflected in a uniformly distributed manner over the column cross-section, for example into the evaporator part of the column disposed below the bottom packing elements, the plates of the bottom packing element 7 terminate at the bottom in serrations 11.

In the case of large columns, for example of diameters of one meter or more, the packing elements can take the form of a number of parts that are disposed one beside the other. In this case, the discrete parts can be held together by the column envelope or shell.

Figure 2:
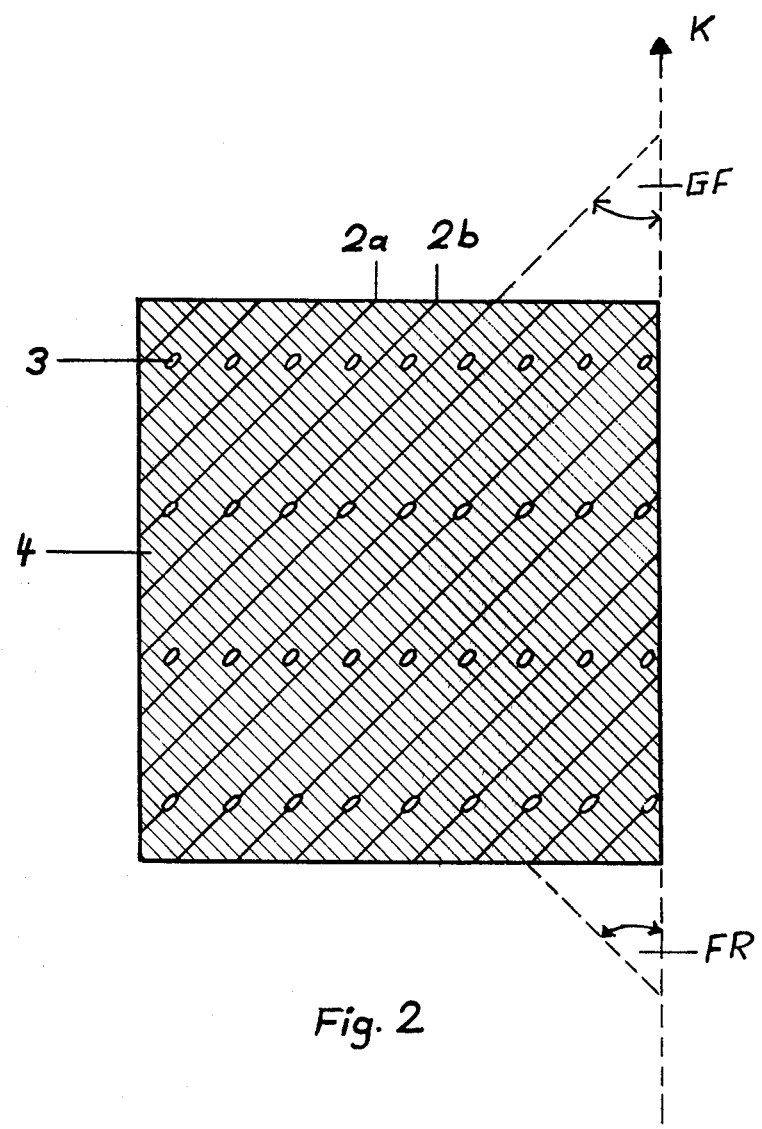
FIG. 2 illustrates a diagrammatic plan view of a plate of a packing in accordance with the invention.

FIG. 2 serves to illustrate the angular relationships of the coarse corrugations and the fluting. As indicated, the column axis extends in the direction K while the coarse corrugations make an angle GF with the column axis and the fine fluting makes an angle FR with the column axis. The angle GF between the corrugations and the column axis lies between 15° and 60° while the angle FK of the fine fluting or grooves relative to the column axis K lies between 15° and 90°.

The invention thus provides a packing element which provides a uniform distribution of a descending liquid phase over the surface of the plates despite the fact that the packing element is made up of foil-like material. In this regard, the term "foil-like" is used herein to define a solid construction having smooth surfaces except, of course, for the fine fluting therein.

What is claimed is:

1. A packing element for an exchange column comprising
   a plurality of corrugated plates of foil-like material disposed in parallel relation, each said plate having corrugations disposed at an angle and in criss-crossing relation to the corrugations of an adjacent plate, each said plate having a plurality of apertures distributed therein, and each said corrugation of each plate having a laterally extending fine fluting therein whereby said apertures and said fine fluting effect a uniform distribution of a downwardly flowing liquid under capillary action.

2. A packing element as set forth in claim 1 wherein said fluting is in the form of grooves.

3. A packing element as set forth in claim 2 wherein said grooves of each plate are disposed at an angle of opposite sign from said angle of said corrugations of each respective plate.

4. A packing element as set forth in claim 3 wherein said grooves are disposed at an angle of 15° to 90° relative to the packing and said corrugations are disposed at an angle of 15° to 60° relative to the packing.

5. A packing element as set forth in claim 1 wherein said plates are made of metal.

6. A packing element as set forth in claim 1 wherein said plates are made of plastics.

7. A packing element as set forth in claim 1 wherein said fluting has a wave length of from 0.3 to 3.0 millimeters.

8. In combination with an exchange column having a longitudinal axis,
   at least one packing element in said column, said packing element including a plurality of corrugated plates of foil-like material disposed parallel to said axis and in contacting relation, each said plate having corrugations disposed at a first angle relative to said axis and in criss-crossing relation to the corrugations of an adjacent plate, each said plate having a plurality of apertures distributed therein, and each said corrugation of each plate having a laterally extending fine fluting therein whereby said apertures and said fine fluting effect a uniform distribution of a downwardly flowing liquid under capillary action.

9. The combination as set forth in claim 8 wherein said fluting is in the form of grooves.

10. The combination as set forth in claim 9 wherein said grooves are disposed at an angle of 15° to 90° relative to said axis and said first angle is from 15° to 60°.

11. The combination as set forth in claim 8 wherein said fluting has a wave length of from 0.3 to 3.0 millimeters.

* * * * *

REEXAMINATION CERTIFICATE (2849th)
United States Patent [19]
Meier

[11] B1 4,296,050
[45] Certificate Issued Apr. 23, 1996

[54] PACKING ELEMENT FOR AN EXCHANGE COLUMN

[75] Inventor: Werner Meier, Elgg, Switzerland

[73] Assignee: Sulzer Bros., Winterthur, Switzerland

Reexamination Requests:
No. 90/002,880, Nov. 10, 1992
No. 90/003,693, Jan. 18, 1995
No. 90/003,733, Feb. 17, 1995

Reexamination Certificate for:
Patent No.: 4,296,050
Issued: Oct. 20, 1981
Appl. No.: 845,784
Filed: Oct. 26, 1977

[30] Foreign Application Priority Data

May 12, 1977 [CH] Switzerland ............... 5948/77

[51] Int. Cl.⁶ .................................................. B01F 3/04
[52] U.S. Cl. .............. 261/112.2; 165/166; 261/DIG. 72
[58] Field of Search ................. 261/94–98, 112.1, 261/112.2, DIG. 72, 79.2, 113; 366/337, 340; 428/185; 55/240, 241; 165/166; 210/150, 151

[56] References Cited

U.S. PATENT DOCUMENTS

| | | | |
|---|---|---|---|
| 2,911,056 | 11/1959 | Edel | 261/153 |
| 3,285,587 | 11/1966 | Huber | 261/96 |
| 3,372,743 | 3/1968 | Pall et al. | 165/166 |
| 3,415,502 | 12/1968 | Munters | 261/112.2 |
| 3,466,151 | 9/1969 | Sicard et al. | 261/95 |
| 3,785,620 | 1/1974 | Huber | 261/DIG. 72 |
| 3,830,684 | 8/1974 | Hamon | 261/112.2 |

FOREIGN PATENT DOCUMENTS

| | | |
|---|---|---|
| 1283250 | 11/1968 | Germany . |
| 2060178 | 11/1971 | Germany . |
| 39-33532 | 11/1964 | Japan . |
| 40-8841 | 3/1965 | Japan . |
| 40-8840 | 3/1965 | Japan . |
| 40-8838 | 3/1965 | Japan . |
| 40-8838 | 8/1965 | Japan . |
| 44-22843 | 9/1969 | Japan . |
| 44-22842 | 9/1969 | Japan . |
| 48-106546 | 12/1973 | Japan . |
| 49-38624 | 10/1974 | Japan . |
| 1004046 | 9/1965 | United Kingdom . |
| 1202704 | 8/1970 | United Kingdom . |
| 1245938 | 9/1971 | United Kingdom . |

*Primary Examiner*—Richard L. Chiesa

[57] ABSTRACT

The packing element is made up of a plurality of corrugated plates which are provided with a plurality of apertures as well as with a fine fluting on the walls of the corrugations. The flutings are disposed on both sides of the plates. The flutings are in the form of grooves which extend at an angle to the axis of the column which is of opposite sign to the angle of the corrugations relative to the axis of the column.

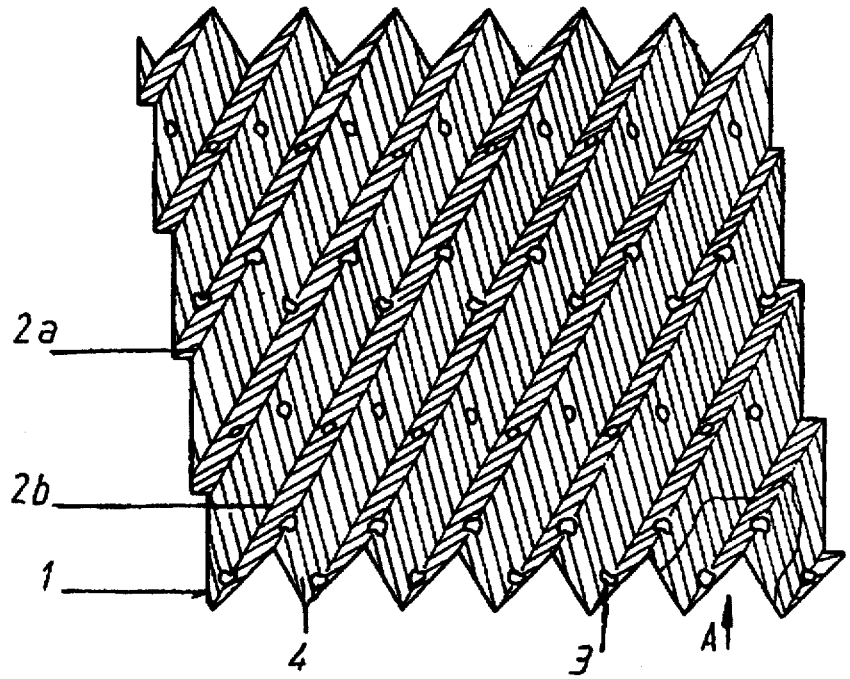

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *